United States Patent [19]

Carney

[11] Patent Number: 4,494,402

[45] Date of Patent: Jan. 22, 1985

[54] DEVICE AND METHOD FOR PRESSURE TESTING

[76] Inventor: Patrick T. Carney, 3127 Lantern Trail, Richmond, Ind. 47374

[21] Appl. No.: 414,979

[22] Filed: Sep. 7, 1982

[51] Int. Cl.³ .............................................. G01M 3/32
[52] U.S. Cl. ........................................ 73/40; 73/49.7
[58] Field of Search .................. 73/40, 118, 49.7, 49.8; 165/95

[56] References Cited

U.S. PATENT DOCUMENTS

| | | |
|---|---|---|
| 2,760,367 | 8/1956 | Stromberg . |
| 2,847,851 | 8/1958 | Enell . |
| 2,940,303 | 6/1960 | Enell . |
| 3,035,436 | 5/1962 | Johnson . |
| 3,313,144 | 11/1967 | Johnson . |
| 3,650,147 | 3/1972 | Moyer ................................. 73/49.7 |
| 4,235,100 | 11/1980 | Branchini ............................ 73/49.7 |

OTHER PUBLICATIONS

Instruction Manual Pressurized Cooling System Tester, Stant Inc., pp. 3-14.

*Primary Examiner*—John W. Caldwell, Sr.
*Assistant Examiner*—Ellwood G. Harding
*Attorney, Agent, or Firm*—Wood, Herron & Evans

[57] ABSTRACT

A device and method are disclosed for simultaneously testing the fluid tightness of the entire pressurizable coolant system of an engine, such as an internal combustion engine, including the radiator, the coolant flow passages within the engine block, the pressure-type radiator filler cap and the connecting hoses. The device and method of the invention further provide for simultaneous testing of the integrity of the outer and inner seals typically formed by the pressure-type radiator filler cap with the radiator filler neck.

11 Claims, 2 Drawing Figures

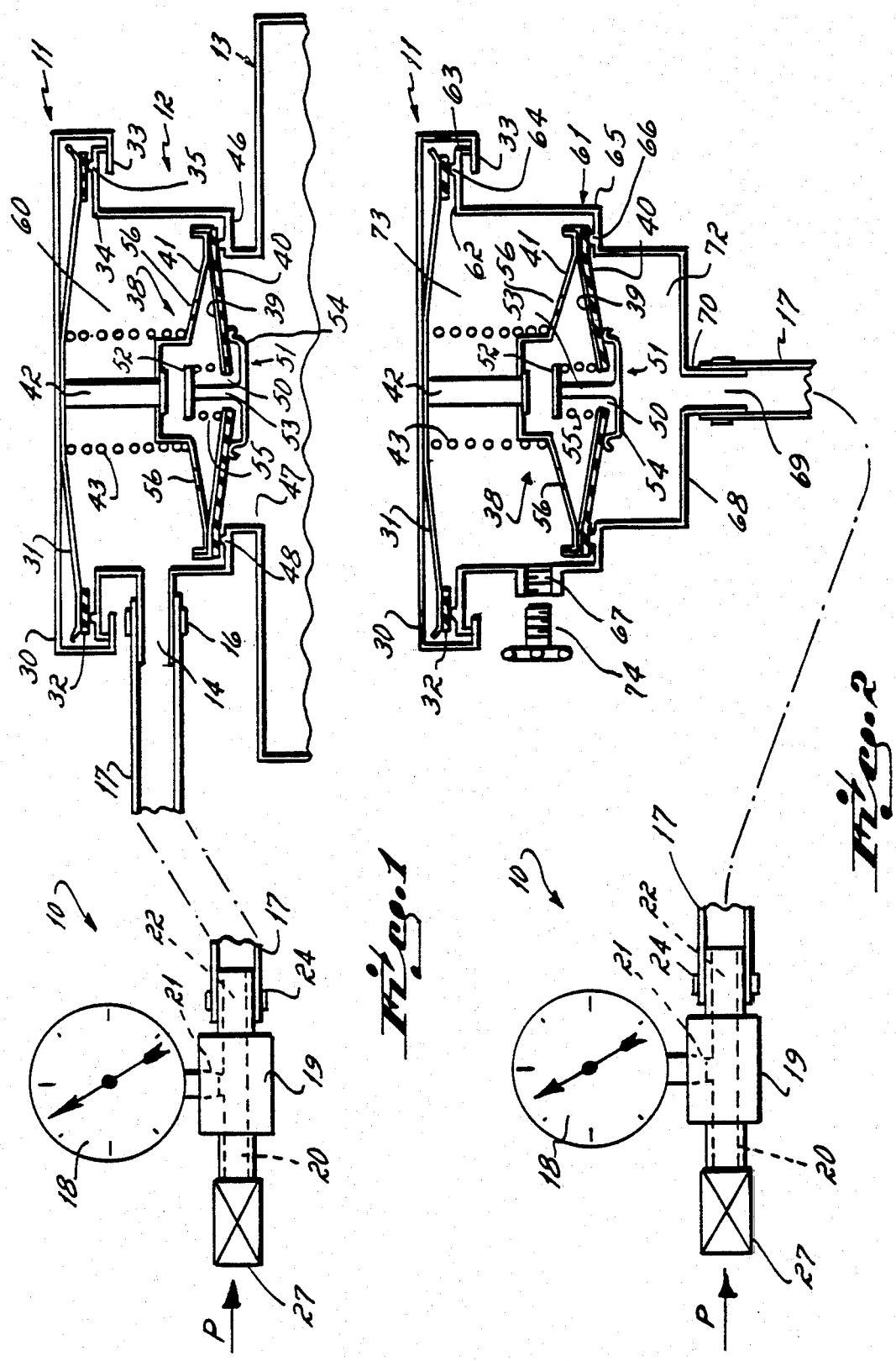

DEVICE AND METHOD FOR PRESSURE TESTING

FIELD OF THE INVENTION

The present invention relates to a pressure tester for use in testing the fluid tightness of closed vessels or systems, and is primarily concerned with a pressure tester for a pressurized internal combustion engine cooling system.

BACKGROUND OF THE INVENTION

The pressure tester and method of testing of the present invention finds its primary use in connection with pressurized automobile engine cooling systems, particularly those systems including a pressure-type cap filler having a one-way vacuum valve. Although the invention is illustrated, and will be described, in that environment, it will be apparent to those skilled in the art that the tester and the method of testing disclosed herein may find suitable uses in other environments where it is desired to observe the pressure integrity of closed systems, the pressures under which pressure responsive valve systems will react to relieve pressure, and the effectiveness and proper calibration of the pressure responsive valves which may be employed in such systems.

The vast majority of internal combustion automobile and truck engines utilize a liquid cooling system to maintain the engine within an optimum range for operating efficiency, the liquid typically being water with certain additives. The cooling system of such internal combustion engines generally employs liquid flow paths that extend within the engine block where heat is transferred from the operating engine to the water, through a water pump which serves to circulate the liquid, and then through a radiator where heat transfer occurs between the liquid and the atmosphere. With the advent of higher horsepower in engines, the use of smaller radiators due to considerations of costs and styling limitations, and higher operating temperatures for the engines, a considerable amount of heat is developed which must be dissipated through a relatively small area represented by the radiator surface. As a consequence, the majority of these cooling systems operate under pressure. By pressurizing the system, the boiling point of the coolant is raised, resulting in less loss of coolant by evaporation with a proportional increase in cooling efficiency.

The amount of pressure developed in these cooling systems depends to a large extent upon the temperature of the coolant and the speed at which the engine is operated. Since the cooling system is designed to be a closed system, any minor leaks present anywhere in the flow path will reduce the efficiency of the system and can result in the excessive loss of coolant. As the coolant is lost through such leaks, the capability of the system to keep the engine temperature from rising above an optimum operating level is accordingly decreased, and if enough of the coolant is lost, overheating occurs with consequent damage to the engine. It is thus commonly observed that the cooling systems of internal combustion engines should be pressure tested periodically and on a regular basis in order to assess the integrity of the system and to detect the presence of leaks.

The pressurized cooling systems currently in use include a radiator having a filler neck formed to provide a mouth including a lip for securing engagement through a camming action with a filler cap to thereby form an outer closure seat around the mouth of the radiator. The typical cap designed for use with this system further includes a resiliently mounted valve element which forms an inner seal to the filler neck through cooperation with an inner seat within the neck. The valve element is under yielding spring pressure such that the inner seal will be broken within a rated pressure range. Ideally, the spring which presses the valve against the inner seat is calibrated to hold the valve in sealing engagement with the inner seat as long as the pressure within the system does not exceed a predetermined value, and then to yield whenever the pressure exceeds that value. Since the cooling efficiency of any such system is optimum when the system is operated under the pressure for which that system was designed, any weakening of the spring or malfunction of the valve which permits the premature escape of pressure will lower the efficiency of the system.

A coolant overflow vent and/or line is provided intermediate the outer and inner seals of the filler neck through which pressure relief occurs. In most vehicles which are equipped with coolant recovery systems, coolant passing through an overflow line is carried to a collection tank. When the engine cools, a one-way vacuum valve located internally of the radiator cap will open in response to the vacuum formed in the radiator, permitting coolant in the collection tank, or simply air, to flow back into the cooling system.

At the present time, there are on the market pressure testers that are designed to simply test the radiator and the radiator filler cap. Such devices typically comprise a small air pump and an associated pressure gauge that communicate with a cap-like fixture which is attachable to the radiator. For instance, when these devices are used to check the radiator, the fill cap is removed from the radiator and the cap-like fixture applied in its place. Pressure is then applied to the radiator, and thus to the entire coolant flow path, through use of the hand pump until the system is at its rated pressure level as measured by the gauge. If little or no pressure drop is thereafter observed, the radiator is presumed to be holding pressure properly. When these devices are used to check the radiator filler cap, the cap is connected directly to the device through the use of an adapter which serves to form a seal with the pressure valve of the filler cap similar to that which exists in the radiator filler neck. The adapter is then pressurized through use of the hand pump, and the gauge is observed for the tightness of the seal as well as for a measurement of when the pressure relief valve in the filler cap opens.

The prior art pressure tester presents a disadvantage in that at least two tests must be performed to test the integrity of the whole system. That is, the radiator and cap must be tested separately. The prior art tester does not provide for the simultaneous testing of the radiator cap and the remainder of the coolant system.

The prior art pressure tester is, in general, only operative to test the integrity of the inner seal of the radiator cap. It does not test the outer seal ordinarily formed with the lip and around the mouth of the filler neck. Additionally, testing with the prior art tester often requires several repeated tests of the cap to be made due to the often inexact seat formed between the valve of the cap, which will retain the seat impression of the filler neck, and the seat presented by the adapter of the pressure tester. This is particularly a problem when the radiator cap is new.

Also, the prior art tester requires that the cap be removed from the filler neck for test purposes. Consequently, a hot pressurized system must be allowed to cool so that the cap can be safely removed, or the system must be otherwise vented to reduce the pressure to a point where the filler cap can be removed. If venting of the hot system is done too quickly, this can result in an unnecessary as well as excessive loss of coolant.

SUMMARY OF THE INVENTION

In light of the foregoing problems and disadvantages presented by these prior art pressure testers, it is an object of this invention to provide an improved pressure tester.

It is a primary object of this invention to provide a pressure tester which can simultaneously test the pressure tightness of an entire coolant system, such as for an internal combustion engine, without the need to remove the filler cap ordinarily employed with the system.

Another and equally important objective is to enable pressure testing of both the inner seal as well as the outer seal of the pressure-type cap ordinarily used with such cooling systems.

Collateral to the foregoing objects is to provide a method for the comprehensive testing of the entire cooling system through (1) simultaneously testing the integrity of the seals of the filler cap and the remainder of the coolant system and (2) the separate testing of the two seals presented by the radiator filler cap to thereby isolate any pressure leak to one of the two seals in the filler cap or to the remainder of the cooling system components.

It is an additional object of the invention to perform such pressure testing in a simple and uncomplicated manner using a minimum number of elements.

To these and other objects, the present invention provides a device and method for simultaneously testing the fluid tightness of the entire coolant system of an engine, including the radiator, the coolant flow passages within the engine block, and the radiator filler cap, and its connecting hoses. Further, this ability to simultaneously test all the components of the cooling system is accomplished without the need to remove the filler cap from its position with the filler neck. Additionally, the instant invention enables the testing of both of the seals presented by the filler cap.

In accordance with one feature of the invention, the device for testing the pressure tightness of an internal combustion engine cooling system is relatively simple in form, consisting of a conduit, which may be a length of flexible rubber hose, a source of pressurized air for the conduit, and some means for determining the level of pressure within the conduit. For example, one form of the invention provides for a suitable length of rubber tubing which communicates with a mount carrying a pressure gauge for measurement of the pressure within the conduit. A source of pressurized air, such as a hand pump, also communicates with the gauge mount such that an enclosed flow path for the pressurized air is formed with the pressure gauge located intermediate the introduction point of the pressurized air and the free end of the rubber tubing. A one-way check valve, such as an auto tire type valve, is advantageously employed at the point of admission of pressurized air into the device.

For purposes of simultaneously testing the fluid tightness of the entire cooling system, the free end of the rubber tubing is placed in communication with the coolant overflow vent of the filler neck. For example, the tubing may be simply slid over the outwardly extending portion of the filler vent and thereupon clamped in place by ordinary hose clamps if a sufficiently snug air-tight friction fit is not obtained. With the conduit or rubber tubing sealingly engaged with the vent, pressure is then applied through the pressure tester.

By applying pressure to the vent, an additional advantage of the invention is apparent, in that the vent itself will consequently be tested for blockage. That is, a sudden and dramatic indication of pressure build up will indicate a clog in the vent.

Due to the presence of the vacuum valve in the filler cap, both the filler cap and the remainder of the coolant system can be pressurized to a predetermined level for testing, ordinarily the rated pressure level for the system. Application of pressure is thereupon discontinued, and the pressure gauge observed for any significant pressure drop which would be indicative of a failure of either the upper seal of the pressure cap or a leak in the cooling system. If no significant pressure drop is observed, the inner seal formed by the pressure cap can thereupon be tested.

The integrity of the inner seal formed by the pressure valve is tested with the cap still in place on the filler neck by reducing the pressure of the upper portion of the cap to ambient or near ambient pressure, and then observing the pressure gauge for any increase in pressure which would be indicative of a leak in the inner seal formed by the valve. Thus, using this device and method, the integrity of the entire cooling system can be ascertained.

In accordance with another feature of this invention, the outer and inner seals of the pressure cap can both be tested, such as in the case where a leak is found in the simultaneous test of the entire cooling system. In this way, if a leak is found, the leak can thereupon be specifically isolated to one or both seals of the filler cap or to the remainder of the cooling system.

To test the cap separately, the testing device further includes an adapter for connecting the conduit to the radiator cap. The adapter is reminiscent of the filler mouth neck, and constitutes a tubular member having an outer mouth circumscribed by an outer seat and a depending cammed lip, which forms an outer seal with the engaged cap. The adapter further provides an inner seat spaced radially inwardly from the wall of the tubular member which forms an inner seal with the pressure valve of the engaged cap. The adapter is designed such that the outer and inner seats of the pressure cap will be resiliently and sealingly engaged with the adapter outer and inner seats, respectively, when the cap is engaged with the adapter, thereby simulating the cap's engagement with the filler neck. A vent is provided between the seats which extends through the tubular wall of the adapter. The bottom of the adapter is closed, with an extended port therein for interconnection with the free end of the conduit of the pressure tester.

With the cap in place in the adapter, the inner seal formed by the pressure valve serves to define an upper and lower chamber to the adapter. To separately test the fluid tightness of the two seals formed by the cap and the operation of the pressure valve, a predetermined amount of pressure is applied to the lower chamber of the adapter to first test the inner valve seal. This amount of pressure will be somewhat less than the rated capacity for the cap, i.e., the point at which the bias of the spring is overcome and the valve unseats. The gauge is then observed for any significant pressure drop which would be indicative of a failure of the inner seal. Additionally, the pressure valve may be tested to determine the point at which the valve unseats. This is accomplished through the admission of additional pressure with observation of the gauge to determine the point at which the seal is broken. This test is important since it is necessary that the valve unseat within a specified range particular to the specific cooling system in order to prevent damage from excessive pressure build-up in the system.

To test the fluid tightness of the outer seal of the cap, for example, if the lower seal was not found to be leaking, the vent hole in the adapter is closed, such as by a plug or finger. Sufficient pressure is then applied to the lower chamber of the adapter to thereby overcome the bias of the lower seal of the radiator cap, thereby pressurizing the upper chamber formed by the cap and adapter. The pressure gauge is then again observed for any drop in pressure which would be indicative of the failure of the outer seal on the radiator cap.

If neither filler cap seal is found to be leaking by virtue of this separate testing, it can then be assumed that any leak located in the initial simultaneous test of the filler cap and coolant system is somewhere within the remainder of the cooling system.

The foregoing objectives, features and advantages of the present invention will be more readily understood upon consideration of the following detailed description of the invention taken in conjunction with the accompanying drawings, in which:

BRIEF DESCRIPTION OF THE DRAWINGS

FIG. 1 is a cross sectional view of a pressure tester according to this invention, shown in operative association with a fragment of a conventional automobile radiator filler neck, some parts being shown schematically; and FIG. 2 is a cross sectional view of a pressure tester and cap adapter in accordance with this invention, shown in operative association with a conventional pressure-type radiator cap.

DETAILED DESCRIPTION OF A PREFERRED EMBODIMENT OF THE INVENTION

Referring now to FIG. 1 of the drawings, a pressure tester made in accordance with the principles of this invention is generally indicated at 10. The pressure tester 10 is shown in operative association with a standard pressure-type filler cap 11 with the cap engaged with the filler neck 12 of a common radiator 13 forming part of a typical pressurizable cooling system generally employed in modern internal combustion engines, particularly those of automobiles and trucks. The point of connection between the pressure tester 10 and the filler neck 12 is made at the coolant overflow vent 14; this particular connection point will be more fully discussed below in regard to the method of testing the fluid tightness of the cooling system, which method forms a part of this invention. The vent 14 is located at a point intermediate an inner seal and an outer seal formed by the engagement of the pressure cap 11 with the filler neck 12, as discussed hereafter.

In the illustrated form of the invention, the pressure tester 10 basically comprises a flexible conduit 17, a pressure gauge 18 and associated gauge mount 19, and a port 20 to which a source of air pressure indicated by the arrow P such as a bicycle pump or auto tire pump, may be applied to thereby pressurize the pressure tester 10 as well as the pressure fill cap 11 and the remainder of the cooling system to which the pressure tester has been connected. The flexible conduit 17, which may be a piece of rubber hose of suitable length, provides a connection at one end between the hose 17 and the coolant overflow vent 14. In general, the coolant overflow vent 14 will be in the form of a small pipe extending axially from the filler neck 12. The vent 14 provides an outlet to the otherwise closed cooling system for the overflow of fluids, such as steam and coolant, to thereby relieve an excessive build-up of pressure within the system. The overflow vent 14 may also have associated with it a line for directing any overflowing fluids to a catch tank (not shown) located elsewhere in the engine. This line will typically be a small plastic hose (not shown) which is frictionally fit over the vent pipe 14; this overflow line is easily removed if necessary when employing the tester 10.

The rubber tubing 17 is appropriately sized so that a snug friction fit will be provided when the end of the tubing is slid over the vent pipe 14. To ensure a sure fit at this point, a retaining element, such as a hose clamp 16, can be advantageously used to be sure that no air leakage occurs at this attachment point.

A suitable pressure gauge 18 is in direct communication with the interior of the rubber tubing 17 so as to indicate the pressure within the tubing 17, and as will be more fully discussed below, also the pressure within the cap 11 and the remainder of the cooling system. The gauge generally employed is a standard gauge for measuring psi. A suitable mount 19 for the gauge is advantageously employed and is standard in form, having a threaded port 21 into which the pressure gauge is screwably fixed and lateral ports 20 and 22. As shown here, one end of the rubber tubing 17 is snuggly fit over the port 22. To ensure a pressure-tight fit of this connection between the rubber tubing 17 and port 22, the hose may be glued in place or additional retaining means, such as a hose clamp 24, can be used.

A pressure source P, such as a hand pump or standard service station auto tire pump, is applied to the pressure tester through port 20. It has been found advantageous to provide a one-way check valve 27, such as a Schrader-type tire inflation valve, for the port 20. Use of a check valve 27 thus provides for the use of the tester 10 with any available source of pressure. When it is desired to depressurize the pressure tester 10, the pressure source is removed from the tester, and the check valve manipulated, such as by simple finger depression of the valve stem, to permit outflow through the pressure tester.

A pressure-type fill cap 11 is shown in operative engagement with a standard filler neck 12 of a typical radiator tank 13. The filler cap 11 may be any of the standard types in use, such as a constant pressure type cap, pressure-vent type cap and the safety type cap. For purposes of fully practicing this invention, the cap should have some means to permit the inflow of air into the coolant system, such as through a one-way vacuum valve. Such vacuum valves are generally employed in most modern filler caps, and serve to permit the inflow of air and/or overflow coolant back into the radiator through the cap in response to a vacuum created within the radiator upon cooling of the engine.

The filler cap 11 has an outer cap member 30 with a yieldable annular plate or wave spring 31 secured to the underside thereof. A flat rubber gasket 32 is located on the underside of the wave spring 31, and is held in place by inwardly extending, oppositely opposed ears or fingers 33 of the cap member 30, as shown in FIG. 1. The filler cap 11 is slidably mounted for limited rotary movement on the filler neck 12, which has an outwardly extending overhanging flange 34. The overhanging flange 34 provides a camming surface for the filler cap ears 33 such that the cap can be torqued into position on the filler neck 12. This camming action causes the outer peripheral portion of the cap member 30 to seat upon the outwardly extending, upwardly facing portion of the flange 34 which forms the lip of the mouth of the filler neck 12, compressing the wave spring 31 and associated gasket 32 to thereby form an outer seal to the filler neck. A bead 35 formed on the upwardly facing portion of the flange 34 facilitates the formation of this outer seal.

Attached to the underside of the cap member 30 is a pressure-responsive, or relief, valve, generally indicated at 38. The pressure valve 38 has a closure plate 39 which is annular in form. Mounted to the underside of the closure plate 39 is a sealing member 40, which may be formed of rubber or similar material. The closure plate 39 and associated sealing member 40 are movably supported beneath the cap member 30 through the use of a generally annular shaped valve-supporting plate 41 which is slidably mounted on a pin or stem 42. The valve supporting plate 41 is fixed to the closure plate 39. A spring 43 is located concentric with the pin 42, and abuts the underside of the cap member 30 and wave spring 31 and the upper face of the valve supporting plate 41. The spring 43 serves to urge the valve 38 to the full length of the support pin 42.

The filler neck 12 includes an interiorly extending bottom wall portion 46 which provides a central aperture 47 to the radiator 13. When the fill cap 11 is in operative engagement with the filler neck 12, the valve 38 seats upon the bottom wall 46 to thereby form an inner seal to the filler neck 14 in general, and the aperture 47 in particular. A bead 48 extending around the upwardly facing portion of the bottom wall 46 serves to facilitate the formation of the seal with the sealing member 40.

The closure plate 39 and sealing member 40 have a centrally located aperture 50. Movably supported in this aperture 50 is a vacuum relief valve, generally indicated at 51. The vacuum relief valve 51 has a valve stem 53 which extends through the aperture 50. The valve stem 53 has an outwardly extending flange 52 located on the upper portion of the stem. An annular valve plate 54 is centrally fixed to the opposite end of the valve stem 53 and extends below the sealing member 40. A spring 55 abuts the bottom face of the flange 52 and the upper face of the valve support plate 39 to thereby urge the valve upwardly. As the spring 55 urges the valve stem upwardly, the annular valve plate 54 is carried upwardly against the sealing member 40 where it seats to thereby seal the aperture 50. The vacuum relief valve serves to relieve any vacuum which may develop in the radiator, such as when an outflow of gas and/or coolant has occurred during the operation of the engine with subsequent cooling. When the vacuum in the radiator is sufficient to overcome the force of the spring 55, the valve moves downwardly, opening the aperture 50. A passage for air and/or coolant is provided to the aperture 50 through the valve supporting plate 41, such as through plural perforations 56 therein, thence through the opened aperture 51 and finally into the radiator 13 of the cooling system. As exemplified by the foregoing and as will be more fully discussed hereinafter, the vacuum relief valve operates when the pressure differential above and below the seated valve 38 serves to open the vacuum relief valve, such as when air under pressure is forced into the filler neck above the inner seal formed by pressure valve 38.

It will be recognized that the foregoing description of a pressure-type filler cap and its operation is by way of general description of the cap, it being recognized that a more detailed and complete description of a pressure-type cap is not necessary for a complete understanding of this invention.

To first test the integrity of the seals formed by the filler cap 11 and the coolant system itself, the pressure tester 10 is connected to the coolant overflow vent 14 in the manner heretofore described, with the filler cap 11 in operative engagement with the filler neck 12, thereby forming the outer and inner seals previously mentioned. Air pressure from a pressure source is then applied to the pressure tester 10 through connection with the check valve 27, thereby pressurizing an interior space 60 formed between the inner and outer seals. Pressurization of this interior space 60 also serves to pressurize the radiator tank 13 in the coolant system, since air under pressure passes through the aperture 51 due to the actuation of the vacuum relief valve caused by the pressure differential above and below the inner seal. Pressure is then increased until the pressure rating for the engine cooling system is reached, for example, 15 psi. When the desired pressure is reached, the pressure source is cut off and the pressure gauge 18 is observed for any significant drop in pressure which would be indicative of a failure in one or both of the seals of the radiator cap or a leak in the remainder of the coolant system. The pressure tightness of the system is generally considered satisfactory when the pressure holds steady or falls very slowly.

If a leak not is detected at this point, or if desired, the inner seal formed by the valve 38 can now be tested. Testing of the valve 38 with the cap 11 in place on the filler neck 12 has the advantage of permitting the inner seal to be tested on the seat ordinarily made between the sealing member 40 and the bottom wall 46. It also permits testing of this seal without the need to remove the cap, which is advantageous when the engine is hot and would require the cooling of the engine or venting of the cooling system before the cap could be removed.

To test the inner seal and valve action of the valve 38, pressure is released through the pressure tester 10, such as by manipulation of the check valve 27. With the interior space 60 now at ambient or near ambient pressure, the pressure tester is again sealed by deactuation of the check valve 27, and the pressure gauge observed for any increase in pressure, which would indicative of a failure of the inner seal formed by the valve 38.

If the foregoing test fails to isolate the leak to the valve 38, or if further testing of the cap 11 is desired, the cap is thereupon removed from the filler neck 12 for separate testing of both the outer and inner seals.

As an alternative way of testing the inner seal formed by the valve 38 as well as the remainder of the cooling system, with the fill cap 11 in place in the filler neck 12, such as where a vacuum valve is not included in a pressure-type cap or there is no coolant recovery system associated with the cap, the pressure tester 10 can be directly attached to the engine cooling system. For example, the flexible conduit 17 may be attached through the use of a suitable adapter at any convenient access point to the cooling system, such as at a coolant hose connection point. The cooling system can thereupon be pressurized in the foregoing manner to determine if either the inner seal formed by the filler cap 11 or the coolant system itself has a leak.

Separate testing of the cap is performed through the use of an adapter 61, shown in FIG. 2. The adapter 61 is preferably a rigid plastic member, tubular in shape and formed to duplicate the interior of the filler neck 12. Thus, the adapter 61 has an outwardly extending upper portion or lip 62 with downwardly depending flanges or fingers 63 which form a camming surface for the cap member 30. A bead 64 extends around the upward surface of the portion 62 to thereby facilitate a sure seal with the gasket 32 which is biased thereagainst by the wave spring 31. Again, similar to the bottom wall of the filler neck 46, an inwardly extending wall 65 is provided in the adapter 61, a bead 66 on the upwardly facing surface thereof serves to promote an inner seal with the valve 38. Intermediate the outer and inner seals formed by the filler cap 12 and the adapter 61 is a vent port 67 which extends through the side wall of the adapter 61. The adapter 61 has a bottom wall 68 which is provided with an aperture or port 69, shown here located centrally therein. The port 69 has a tubular extension 70 which facilitates attachment of the flexible conduit 17 of the pressure tester 10.

With the filler cap 11 engaged to the adapter 61 and the pressure tester 10 attached, the outer and inner seals of the cap 11 can now be simultaneously tested. Pressure is applied to a lower chamber 72 which is formed within the adapter by virtue of the inner seal. Pressure is admitted up to about the rated capacity of the pressure cap, e.g., 15 psi. Additional pressure is then discontinued, and the gauge 18 of the pressure tester 10 observed for any significant fall in pressure which would be indicative of a failure of the inner seal formed by the valve 38.

If no significant pressure drop is observed, or if desired, additional pressure is applied to the lower chamber 72 sufficient to overcome the predetermined setting of the resistance in the valve 38 provided by the spring 43, thereby forcing the valve 38, including the valve supporting plate 41 and sealing member 40 upwardly, the sealing member 40 thereby being lifted off its seat on wall 65. The excess pressure thereupon exhausts into an upper chamber 73 of the adapter and out through the vent 67. The gauge can be observed for the point at which the valve 38 unseats, indicated both by the inability to further increase pressure and the exhaustion through vent 67.

In order to test the outer seal formed by the filler cap 11, vent 67 is plugged, such as by placing a finger over the vent 67 or through the use of an appropriate plug 74. Pressurized air is then applied to the adapter sufficient to overcome the inner seal, e.g., 16 or 17 psi for a cap rated at 15 psi. With the vent 67 thus plugged, the upper chamber 73 thereupon becomes pressurized. Additional pressure is discontinued.

At this point, both the upper and lower chambers, 72 and 73, respectively, are pressurized to a like extent, e.g., 16 to 17 psi. Since no pressure differential exists between upper and lower chambers, the valve 38 will thereupon reseat. Any air leak in the upper seal of the filler cap 11 will thus cause a decrease in pressure within the upper chamber 73 creating a pressure differential with the lower chamber 72 which will ultimately cause the valve 38 to unseat. A significant drop in pressure observed in the lower chamber 72 will thus be indicative of a failure of the outer seal, since the integrity of the inner seal has previously been tested.

If no leak is found in either of the seals formed by the filler cap 11, any leak previously ascertained through the simultaneous testing of the cap and coolant system will thus have been isolated to the coolant system itself. The cap 11 can be replaced on the filler neck 12 and the entire system repressurized as previously disclosed, and the radiator 13 and engine block and connecting hoses visually observed for coolant loss.

While the principles of this invention have been described above in connection with a specific preferred device, it is to be clearly understood that this description is made only by way of an example and not as a limitation of the scope of the invention. For example, while the invention has been illustrated as applied to a liquid cooling system of an internal combustion engine of an automobile or truck, it will be noted that the invention is applicable to any similar engine liquid cooling system.

What is claimed is:

1. A pressure testing device for testing the fluid tightness of an engine cooling system, the engine cooling system having a filler neck formed to provide an open mouth circumscribed by an outer seat, the filler neck further providing an inner seat, and an overflow vent between the seats, said filler neck having an interior chamber between said seats, and a pressure-type cap sealingly engageable with the outer seat of the filler neck to secure the top to the neck in spanning relation to the mouth thereof, and sealingly engageable with the inner seat of the filler neck, thereby forming outer and inner seals therewith, the cap further including a vacuum valve operative as a bypass of pressure from the interior chamber of said filler neck through said cap into the engine cooling system, comprising:
   a conduit,
   means for connecting the conduit to the vent of the filler neck,
   a source of pressure for the conduit,
   means for determining the level of pressure within the conduit.

2. The pressure testing device of claim 1, further including a one-way check valve through which pressure is admitted to the conduit, and wherein the means for determining pressure is a pressure gauge, the pressure tester further including mounting means for the pressure gauge connecting with the conduit.

3. The pressure testing device of claim 1, wherein the vent is in the form of a tube, and the conduit is a flexible hose slidably engageable over the tube exterior and retained in place by an adjustable clamp.

4. The pressure testing device of claim 1, further including adapting means for attaching the pressurizing means to the filler cap portion of the cooling system, the cap being removed from the filler neck for separate testing, the adapter comprising:
   a tubular member having an open mouth circumscribed by an outer seat, and providing an inner seat spaced radially inwardly from the wall of the tubular member, a vent between the seats extending through the tubular wall, and a closed bottom having a port therein for interconnection with the pressure tester conduit, the adapter designed such that the pressure-type cap will be resiliently and sealingly engaged with the adapter outer and inner seats when the cap is engaged with the adapter, thereby forming outer and inner seals therewith, the inner seat serving to define an upper and lower chamber to the adapter, whereby pressure admitted to the lower chamber through the port will serve to test the fluid tightness and function of the lower seal.

5. The pressure testing device of claim 4, further including plug means for the adapter vent, whereby increasing pressure admitted to the lower chamber through the port will serve to first unseal the lower seal to thereby test the integrity of the outer seal formed by the cap.

6. A method for comprehensively testing the fluid tightness of a pressurized engine cooling system, wherein the cooling system includes a filler neck formed to provide an open mouth circumscribed by an outer seat, and an inner seat, and an overflow vent between the seats, said filler neck having an interior chamber between said seats, and a pressure-type cap sealingly engageable with the outer seat of the filler neck to secure the cap to the neck in spanning relation to the mouth thereof, and having a pressure responsive valve sealingly engageable with the inner seat of the filler neck, thereby forming an outer and inner seal therewith, the cap further including a vacuum valve operative as a bypass of pressure from the interior chamber of said filler neck through said cap into the engine cooling system, said method comprising the steps of:

releasably and sealingly attaching a pressure tester to the vent of the filler neck, applying a source of gas under pressure to the pressure tester, pressurizing the pressure tester and cooling system to a predetermined pressure greater than local atmospheric pressure, discontinuing application of gas under pressure, and observing any pressure drop which occurs.

7. The method of claim 6, wherein the pressure tester comprises:

a conduit, means for connecting the conduit to the vent of the filler neck, a source of pressure for the conduit, means for determining the level of pressure within the conduit.

8. The method of claim 6, further including the steps of:

removing the pressure cap from the filler neck, attaching the cap to an adapter, the cap when engaged with the adapter serving to form an upper and lower chamber to the adapter, the adapter having a vent in the upper chamber, pressurizing the lower chamber of the adapter to a predetermined pressure, observing any pressure drop which occurs, sealing the vent of the adapter, re-pressurizing the lower chamber of the adapter to a pressure sufficient to unseat the inner seal formed by the cap, thereby pressurizing the upper chamber, and observing any pressure drop which may occur.

9. A method for testing the outer and inner seals formed by a pressure-type cap, comprising the steps of:

attaching the cap to an adapter, the cap when engaged with the adapter serving to form an upper and lower chamber to the adapter, the adapter having a vent in the upper chamber, pressurizing the lower chamber of the adapter to a predetermined pressure, observing any pressure drop which occurs, sealing the vent of the adapter, re-pressurizing the lower chamber of the adapter to a pressure sufficient to unseal the lower seal of the cap, thereby pressurizing the upper chamber, and observing any pressure drop which occurs.

10. A method for comprehensively testing the fluid tightness of a pressurized engine cooling system, wherein the cooling system includes a filler neck formed to provide an open mouth circumscribed by an outer seat and an inner seat, and an overflow vent between the seats, said filler neck having an interior chamber between said seats, and a pressure-type cap sealingly engageable with the outer seat of the filler neck to secure the cap to the neck in spanning relation to the mouth thereof, and having a pressure responsive valve sealingly engageable with the inner seat of the filler neck, thereby forming an outer and inner seal therewith, the cap further including a vacuum valve operative as a bypass of pressure from the interior chamber of said filter neck through said cap into the engine cooling system, said method comprising the steps of:

releasably and sealingly attaching a pressure tester to the vent of the filler neck, applying a source of gas under pressure to the pressure tester, pressurizing the pressure tester and cooling system to a predetermined pressure, discontinuing applicaton of gas under pressure, making a first observation of any pressure drop, releasing pressure from the tester, and making a second observation for any pressure increase.

11. The method of claim 10, further including the steps of:

removing the pressure cap from the filler neck, attaching the cap to an adapter, the cap when engaged with the adapter serving to form an upper and lower chamber to the adapter, the adapter having a vent in the upper chamber, pressurizing the lower chamber of the adapter to a predetermined pressure, observing any pressure drop which occurs, sealing the vent of the adapter, re-pressurizing the lower chamber of the adapter to a pressure sufficient to unseat the inner seal formed by the cap, thereby pressurizing the upper chamber, and observing any pressure drop which may occur.

* * * * *